US008556547B2

(12) United States Patent
Takagi et al.

(10) Patent No.: US 8,556,547 B2
(45) Date of Patent: Oct. 15, 2013

(54) RADIUS END MILL

(75) Inventors: Yuji Takagi, Akashi (JP); Seiichiro Kitaura, Akashi (JP)

(73) Assignee: Mitsubishi Materials Corporation, Tokyo (JP)

( * ) Notice: Subject to any disclaimer, the term of this patent is extended or adjusted under 35 U.S.C. 154(b) by 271 days.

(21) Appl. No.: 13/138,126

(22) PCT Filed: Jan. 13, 2010

(86) PCT No.: PCT/JP2010/050254
§ 371 (c)(1),
(2), (4) Date: Jul. 11, 2011

(87) PCT Pub. No.: WO2010/084805
PCT Pub. Date: Jul. 29, 2010

(65) Prior Publication Data
US 2011/0268513 A1    Nov. 3, 2011

(30) Foreign Application Priority Data

Jan. 21, 2009  (JP) ................................ 2009-011047

(51) Int. Cl.
*B23C 5/10* (2006.01)
(52) U.S. Cl.
USPC .............................................. 407/54; 407/62
(58) Field of Classification Search
CPC ........................................................ B23C 5/10
USPC .................................. 407/53, 54, 56, 62, 115
See application file for complete search history.

(56) References Cited

U.S. PATENT DOCUMENTS

2005/0186037 A1 * 8/2005 Svensson ........................ 407/53
2006/0060053 A1 * 3/2006 Tanaka et al. .................. 83/663

FOREIGN PATENT DOCUMENTS

| EP | 1348508 A1 * | 10/2003 |
| EP | 1908543 A1 | 4/2008 |
| JP | 2003-071626 A | 3/2003 |
| JP | 2003-165015 A * | 6/2003 |
| JP | 2007-030074 A | 2/2007 |
| JP | 2008-110472 A | 5/2008 |
| WO | WO-2004/058438 A1 | 7/2004 |

OTHER PUBLICATIONS

International Search Report dated Apr. 6, 2011, issued for PCT/JP2010/050254.

* cited by examiner

*Primary Examiner* — Daniel Howell
*Assistant Examiner* — Ryan Rufo
(74) *Attorney, Agent, or Firm* — Edwards Wildman Palmer LLP

(57) ABSTRACT

An end mill body wiih a corner cutting edge forming a convex arc shape of which the rotation locus becomes convex toward the tip outer peripheral side is formed at a side ridge portion of the corner cutting edge rake face, a gash is formed on the inner peripheral side of the corner cutting edge rake face, and an end cutting edge connected to the corner cutting edge and extending toward the inner peripheral side is formed at a tip-side side ridge portion of the end cutting edge rake face. An intersection line between the corner cutting edge rake face and the end cutting edge rake face is located closer to the radial inner peripheral side with respect to the axis than the center of the convex arc that the corner cutting edge forms in the rotation locus.

2 Claims, 2 Drawing Sheets

RADIUS END MILL

TECHNICAL FIELD

The present invention relates to a radius end mill in which a corner cutting edge forming a convex arc shape is formed at the outer periphery of a tip portion of an end mill body.

BACKGROUND ART

As this type of radius end mill, for example, Patent Citation 1 suggests a radius end mill in which a main gash face is formed on the inner peripheral side of a tip portion of the wall face of a flute which faces the rotational direction of a tool, an end cutting edge is formed at the tip of the main gash face, a sub-gash face is formed on the outer peripheral side of the main gash face so as to retreat via a stepped portion with respect to the main gash face, and a corner cutting edge which has a substantially convex arc shape from the tip of the sub-gash face to the outer periphery thereof is formed so as to be connected to the outer peripheral side of the end cutting edge.

Additionally, for example, Patent Citation 2 also suggests a radius end mill in which a gash is formed at the tip of a flute, an end cutting edge which is continuous via a cutting edge of a corner R from an outer peripheral cutting edge is formed at a tip-side side ridge portion of the wall face of the gash which faces the rotational direction of the end mill, the wall face of the gash which faces the rotational direction of the end mill is formed in a planar shape, and an intersection ridgeline of the wall face of the flute which faces the rotational direction of the end mill is made to intersect the cutting edge of the corner R.

In the radius end mills described in these Patent Citations 1 and 2, the main gash face and the sub-gash face are formed via the stepped portion, or the planar wall face of the gash which faces the rotational direction of the end mill is formed such that the intersection ridgeline with the wall face of the flute which faces the rotational direction of the end mill intersects the cutting edge of the corner R. Thereby, chips can be divided by the stepped portion or intersection ridgeline, and processability of chips can be improved.

[Patent Citation 1] Pamphlet of International Publication No. 2004/058438

[Patent Citation 2] Japanese Unexamined Patent Application Publication No. 2008-110472

DISCLOSURE OF THE INVENTION

Technical Problem

However, if the stepped portion or intersection ridgeline which intersects the corner cutting edge in this way is formed at a rake face, a rake angle or the like changes abruptly on both sides of the stepped portion or intersection ridgeline. Therefore, variations occur even in the load that acts at the time of cutting, and the cutting edge strength also changes. For this reason, in a case where the intersection ridgeline is made to intersect about the middle of the cutting edge of the corner R particularly as in the radius end mill described in Patent Citation 2, there is a possibility that the corner cutting edge may be damaged on the side where the cutting edge strength is weak or on the side where a large cutting load acts.

Additionally, if the rake angle changes abruptly in the middle of the corner cutting edge as the stepped portion or intersection ridgeline intersect in this way, chips generated across the stepped portion or intersection ridgeline are generated so as to be torn away. Therefore, chips can be divided to improve processability as described above. However, there is also possibility that traces which are generated as chips are torn away from the surface of a workpiece may be left in stripes, and the roughness of the surface of workpiece may be spoiled.

The invention has been made against such a background, and the object thereof is to provide a radius end mill which can prevent a corner cutting edge from being damaged due to changes in the cutting edge strength of a corner cutting edge or variations in the load at the time of cutting, or prevent degradation of the roughness of a surface of workpiece.

Technical Solution

In order to solve the above problems and achieve such an object, the radius end mill is a radius end mill in which a flute is formed at a tip outer periphery of an end mill body which rotates around an axis, the tip outer peripheral side of the wall face of the flute which faces the rotational direction of the end mill is to be used as a corner cutting edge rake face, a corner cutting edge forming a convex arc shape of which the rotation locus around the axis becomes convex toward the tip outer peripheral side is formed at a side ridge portion of the corner cutting edge rake face, a gash is formed on the inner peripheral side of the corner cutting edge rake face, the wall face of the gash which faces the rotational direction of the end mill is to be used as an end cutting edge rake face, an end cutting edge connected to the corner cutting edge and extending toward the inner peripheral side is formed at the tip-side side ridge portion of the end cutting edge rake face, and an intersection line between the corner cutting edge rake face and the end cutting edge rake face is located closer to the radial inner peripheral side with respect to the axis than the center of the convex arc that the corner cutting edge forms in the rotation locus around the axis, and extends from the rear end side in the direction of the axis more than the protruding end of the corner cutting edge in the direction of the axis.

In the radius end mill constructed in this way, the end cutting edge rake face intersects the corner cutting edge rake face at a position where the corner cutting edge forming the convex arc shape curving radialy inwardly and slightly rearwardly beyond the protruding end of the corner cutting edge in the direction of the axis from the outer peripheral side along the convex arc, and the end cutting. edge formed at the tip-side side ridge portion of the end cutting edge rake face also extends toward the inner peripheral side from this position. That is, as described above, the tip of an intersection line between the corner cutting edge rake face and the end cutting edge rake face is located closer to the radial inner peripheral side with respect to the axis than the center of the convex arc that the corner cutting edge forms in the rotation locus around the axis. Therefore, the intersection point between the end cutting edge and the corner cutting edge, or the intersection line between the end cutting edge rake face and the corner cutting edge rake face extending from this intersection point to the rear end side is not located at a ¼ arcuate portion of the corner cutting edge, namely, a portion from the protruding end in the direction of the axis to the outer peripheral end, to be used for cutting a workpiece.

Accordingly, according to the radius end mill of the above construction, the rake angle or the like does not change abruptly at the portion of the corner cutting edge to be used mostly for cutting in this way. Along with this, extreme variations in the cutting load which acts on the corner cutting edge, or the cutting edge strength are eliminated, and damage to the corner cutting edge can be prevented. Additionally, since the intersection line between the end cutting edge rake face and the corner cutting edge rake face does not intersect the portion of the corner cutting edge to be used for cutting in this way, the generation of chips across such an intersection line is also reduced to a low level, and striped traces are prevented from being left on a surface of workpiece. Additionally, even if traces are left, the traces can be shaved off by the periphery of the protruding end of the corner cutting edge protruding closer to the tip side in the direction of the axis than the intersection line. Thus, the roughness of a surface of workpiece can be improved.

Here, as described above, when the tip of the intersection line between the corner cutting edge rake face and the end cutting edge rake face is located closer to the radial inner peripheral side with respect to the axis than the center of the convex arc that the corner cutting edge forms in the rotation locus around the axis, it is desirable that the difference between the radial length from the axis to the center of the convex arc that the corner cutting edge forms and the radial length from the axis to the tip of the intersection line is set to 0.1 mm or more, and is set to a value within a range of 0.2 mm+0.2×R or less with respect to the radius R (mm) of the convex arc that the corner cutting edge forms in the rotation locus around the axis. That is, when the difference between these lengths is smaller than 0.1 mm, there is a possibility that the tip of the intersection line may approach the protruding end of the corner cutting edge excessively, and the above-described effect may not be reliably exhibited. On the other hand, when the difference is greater than 0.2 mm+0.2×R with respect to the radius R (mm) of the convex arc that the corner cutting edge forms, there is a possibility that the sharpness of the end cutting edge may be lowered.

Advantageous Effects

As described above, according to the present invention, it is possible to prevent the rake angle or the like from changing abruptly within a range where the corner cutting edge is to be used mostly in the radius end mill, it is possible to prevent variations in cutting edge strength or cutting load, thereby preventing damage to the corner cutting edge to extend the service life of the end mill, and it is possible to prevent striped traces from being left on a surface of workpiece to improve the roughness of the surface of workpiece.

EXPLANATION OF REFERENCE

1: END MILL BODY
3: CUTTING EDGE PORTION
4: FLUTE
6: OUTER PERIPHERAL CUTTING EDGE
7: GASH
8: END CUTTING EDGE RAKE FACE
9: END CUTTING EDGE
10: RECESS
11: CORNER CUTTING EDGE RAKE FACE
12: CORNER CUTTING EDGE
O: AXIS OF END MILL BODY 1
L: INTERSECTION LINE BETWEEN END CUTTING EDGE RAKE
FACE 8 AND CORNER CUTTING EDGE RAKE FACE 11
P: PROTRUDING END OF CORNER CUTTING EDGE 12
Q: INTERSECTION POINT (TIP OF INTERSECTION LINE L)
BETWEEN END CUTTING EDGE 9 AND CORNER CUTTING EDGE 12
R: RADIUS OF CONVEX ARC THAT CORNER CUTTING EDGE 12
FORMS IN ROTATION LOCUS AROUND AXIS O
S: CENTER OF CONVEX ARC THAT CORNER CUTTING EDGE
FORMS (CENTER OF CIRCLE C ALONG WHICH CONVEX ARC RUNS)
A: RADIAL LENGTH FROM AXIS O TO CENTER S
B: RADIAL LENGTH FROM AXIS O TO INTERSECTION POINT Q

BEST MODE FOR CARRYING OUT THE INVENTION

Figure 1:
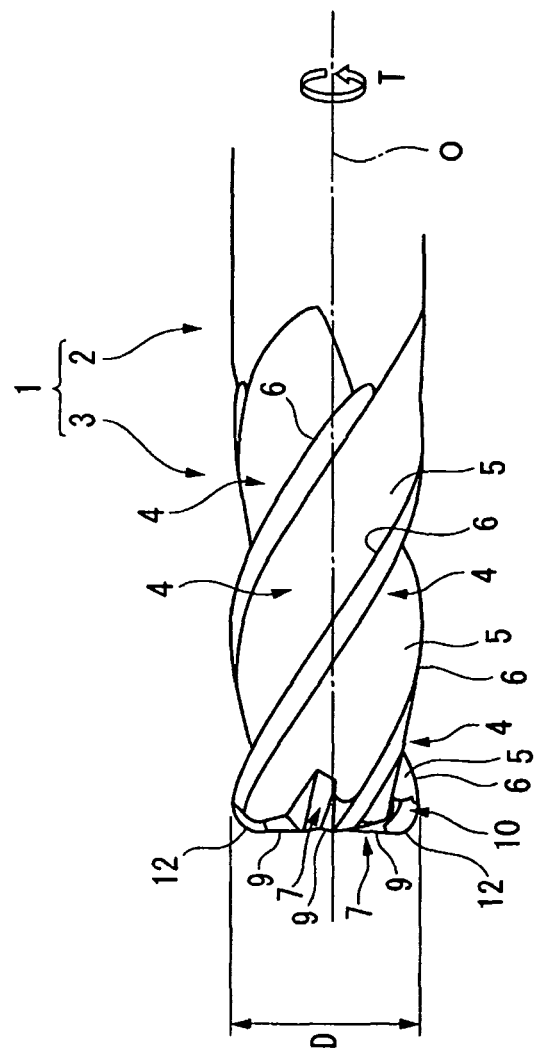
FIG. 1 is a side view of a tip portion of an end mill body 1 showing one embodiment of the invention.
Figure 2:
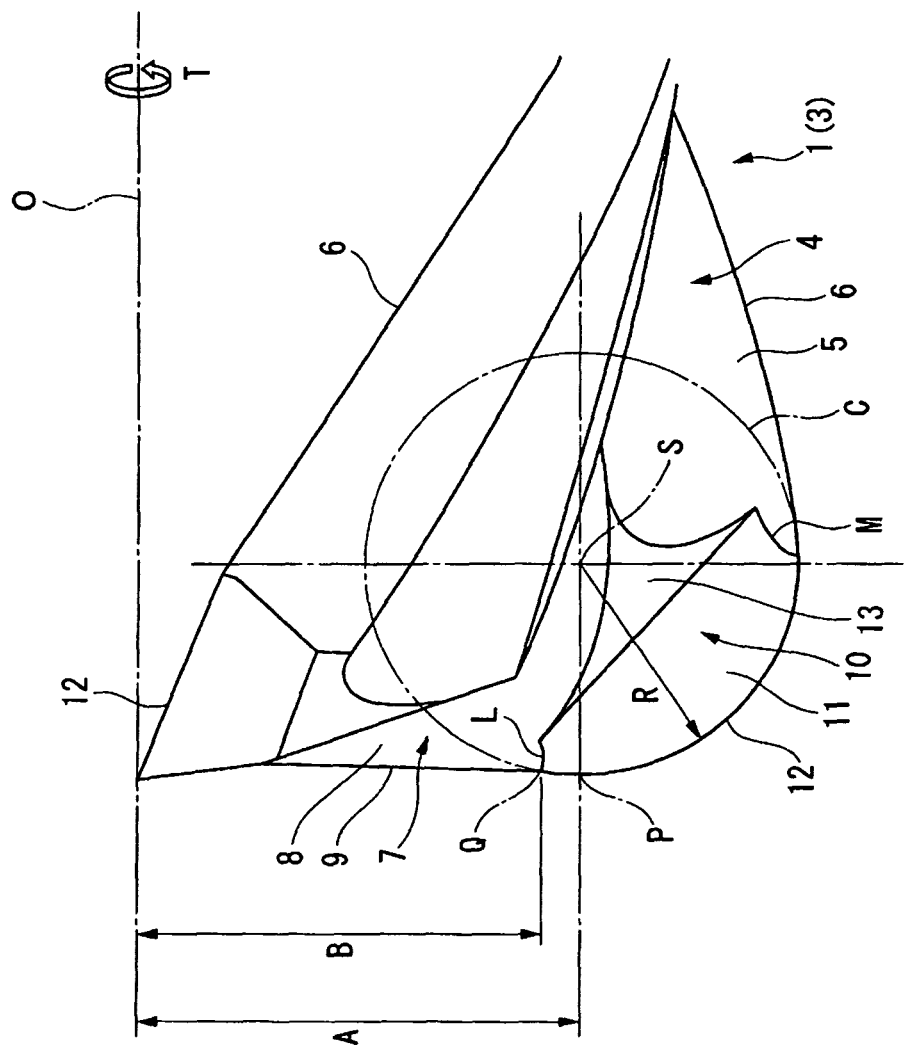
FIG. 2 is a partially enlarged side view of the embodiment shown in FIG. 1.

FIGS. 1 and 2 show one embodiment of a radius end mill of the invention. In the present embodiment, the end mill body 1 is integrally formed in the shape of a substantially columnar shaft about an axis O from hard materials, such as cemented carbide, the portion of the end mill body 1 on the rear end side (on the right side in FIGS. 1 and 2) is used as a shank portion 2 for mounting the end mill body 1 on a spindle of a machine tool, the portion of the end mill body 1 on the tip side (on the left side in FIGS. 1 and 2) is used as a cutting edge portion 3, and the end mill body 1 is fed out while being rotated in a rotational direction (shown by a symbol T) of the end mill around the axis O by the machine tool, thereby performing cutting work on a workpiece using the cutting edge portion 3.

A plurality of (four in this embodiment) flutes 4 are formed at equal intervals in a circumferential direction at an outer periphery of the cutting edge portion 3. Also, these flutes 4 are twisted backward in the rotational direction T of the end mill around the axis O from a tip of the end mill body 1 toward the rear end side thereof. The wall faces of the flutes 4 which face the rotational direction T of the end mill, and ridgeline portions intersecting the outer peripheral surface (outer peripheral relief) of the cutting edge portion 3 connected to the rear sides of the wall facing in the rotational direction T of the end mill, i.e., the outer-peripheral-side side ridge portions of the wall faces, are formed with outer peripheral cutting edges 6 using the wall faces as outer peripheral cutting edge rake faces 5. The outer peripheral cutting edges 5 are formed so as to be twisted backward in the rotational direction T of the end mill around the axis O as the edges go to the rear end side, similarly to the flutes 4.

Additionally, gashes 7 are formed at the tip portion of the cutting edge portion 3, i.e., at the foremost portion of the end mill body 1, such that a tip-side opening of each flute 4 is cut off and widened to the inner peripheral side. The wall face of the gash 7 which faces the rotational direction T of the end mill is used as an end cutting edge rake face 8, and an end cutting edge 9 which extends up to the vicinity of the axis O in the radial direction with respect to the axis O is formed at a tip-side side ridge portion of the gash 7. Here, the end cutting edge rake face 8 is formed so as to have an inclination angle gentler than a twist angle that the flute 4 and the outer peripheral cutting edge 6 form with respect to the axis O, and thereby, an axial rake angle smaller than the twist angle of the outer peripheral cutting edge 6 is given to the end cutting edge 9. Moreover, the end cutting edge 9 is formed in the shape of a straight line which is inclined so as to extend to the rear end side at a slight angle as it goes to the radial inner peripheral side.

Meanwhile, a recess 10 is formed at a corner portion where the end cutting edge 9 and the outer peripheral cutting edge 6 intersect each other, on the tip outer peripheral side of the wall face of the flute 4 which faces the rotational direction T of the end mill. In the present embodiment, the recess 10 is formed such that the portion where the outer peripheral cutting edge rake face 5 and the end cutting edge rake face 8 intersect each other is further cut out. The wall face of the recess 10 which faces the rotational direction T of the end mill is used as a corner cutting edge rake face 11, and a corner cutting edge 12 connected to the tip of the outer peripheral cutting edge 6 and the outer peripheral end of the end cutting edge 9 are formed at a side ridge portion on the tip outer peripheral side of the corner cutting edge rake face 11. The corner cutting edge 12 is formed in the shape of a convex arc which becomes convex toward the tip outer peripheral side along a circle C having a center S on the end cutting edge rake face 8 in the present embodiment as shown in FIG. 2, in a rotation locus around the axis O.

Accordingly, the corner cutting edge rake face 11 is formed so as to intersect both the end cutting edge rake face 8 and the outer peripheral cutting edge rake face 5, respectively, at an obtuse angle at intersection lines L and M. In the present embodiment, the corner cutting edge rake face is formed as a uniformly continuous slope which is inclined at an angle gentler than the twist angle that the flute 4 and the outer peripheral cutting edge 6 form with respect to the axis O, and at an angle larger than the axial rake angle of the end cutting edge 9. In addition, in the present embodiment, the wall face 13 of the recess 10 which rises from the corner cutting edge rake face 11 is formed so as to bulge gradually with respect to the corner cutting edge rake face 11, as it goes radialy inwardly and slightly rearwardly so as to face the tip outer peripheral side of the end mill body 1, and extends so as to have a concavely curved ridgeline between the end cutting edge rake face 8 and the outer peripheral cutting edge rake face 5.

As described above, the intersection line L is formed between the corner cutting edge rake face 11 and the end cutting edge rake face 8, so as to intersect each other at an obtuse angle. This intersection line L starts from a position a little nearer to the rear end than that of a protruding end P of the corner cutting edge 12 in the direction of the axis O; wherein the rotation locus of the corner cutting edge 12 around the axis O shows a convex arc shape. That is, the intersection point Q between the end cutting edge 9 and the corner cutting edge 12 which is the tip of the intersection line L is located slightly closer to the rear end side in the direction of the axis O than the protruding end P.

Accordingly, the intersection line L extends such that the intersection point Q which is the tip of the intersection line is located closer to the radial inner peripheral side with respect to the axis O than the center (center of the circle C) S of the convex arc that the corner cutting edge 12 forms in the rotation locus around the axis O, i.e., such that the corner cutting edge 12 reaches the protruding end P located on a straight line passing through the above center S and parallel to the axis O while drawing a convex arc toward the tip inner peripheral side from an intersection point with the outer peripheral cutting edge 6, and reaches the intersection point Q with the end cutting edge 9 so as to curve around the rear end side slightly while facing the inner peripheral side with the convex arc shape beyond the protruding end P.

Here, the difference A-B between the radial length A from the axis O to the center S of the convex arc that the corner cutting edge 12 forms, and the radial length B similarly from the axis O to the intersection point Q which is the tip of the intersection line L is set to 0.1 mm or more irrespective of the diameter D of a circle that the outer peripheral end of the corner cutting edge 12 forms in the rotation locus around the axis O, i.e., the external diameter of the cutting edge of the radius end mill, or the radius (radius of the circle C) R of the convex arc that the corner cutting edge 12 forms, and is set to a value within a range of $0.2 \text{ mm} + 0.2 \times R$ or less with respect to the radius R (mm) of the convex arc. Additionally, the intersection line L is adapted so as to slightly extend to the rear end side from the intersection point Q, and be then connected to the intersection line between the corner cutting edge rake face 11 and the wall face 13 of the recess 10, and the ridgeline between the wall face 13 and the end cutting edge rake face 8.

As described above, by rotating the end mill constructed in this way around the axis O, and by feeding it in the direction intersecting the axis O; the end mill forms a surface of workpiece, such as a concavely curved surface, in work materials, such as a metallic mold, with its corner cutting edge 12. Especially, ¼ arcuate portion which is on the corner cutting edge 12, and is from the protruding end P in the direction of the axis O to the outer peripheral end, is used mostly for forming the above surface.

However, at this time, in the radius end mill of the above construction, the intersection point Q between the corner cutting edge 12 and the end cutting edge 9 is located closer to the rear end side in the direction of the axis O than the protruding end P. Thus, the intersection line L between the end cutting edge rake face 8 and the corner cutting edge rake face 11 extends to the rear end side from the intersection point Q. That is, the corner cutting edge 12 is formed so as to curve radialy inwardly and slightly rearwardly beyond the protruding end P. Thus, the intersection line L between the end cutting edge rake face 8 and the corner cutting edge rake face 11 is not located at the portion used mostly for cutting.

For this reason, since chips are not generated so as to be laid across the intersection point Q or the intersection line L, and do not extend so as to scratch both the end cutting edge rake face 8 and the corner cutting edge rake face 11 which are bent at an obtuse angle with the intersection line L as a border, and the uniform flow of chips generated by the corner cutting edge 12 is on the corner cutting edge rake face 11 which is continuously connected to the corner cutting edge 12, it is possible to avoid occurrence of variations in the cutting load which acts on the end mill body 1 from the cutting edge. Additionally, even when seen from the end mill body 1 side, the corner cutting edge rake face 11 of the corner cutting edge 12 used for cutting in this way is continuous without being bent at an angle. It is thereby possible to maintain the cutting edge strength of the corner cutting edge 12 over the entire length thereof without extreme variations. Thus, the cutting load and the cutting edge strength are stabilized in this way. Thereby, damage, such as chipping damage, can be prevented from occurring at the corner cutting edge 12, and it is possible to provide a radius end mill with a long tool life.

Moreover, the intersection point Q with the end cutting edge 9 or the intersection line L with the end cutting edge rake face 8 is not formed in the corner cutting edge 12 of the above ¼ arcuate portion or its corner cutting edge rake face 11 which is provided for use in this way. Therefore, at the time of cutting, the intersection point Q or intersection line L does not cut into a work material, and there is also no case in which traces, which are generated as chips are divided by the intersection point Q or the intersection line L, are not left in stripes on the surface of the workpiece. For this reason, according to the radius end mill of the above construction, the roughness or preciseness of a surface of workpiece to be formed on a work material can be improved, and high quality cutting work can be promoted. In addition, the chips generated by the ¼ arcuate portion of the corner cutting edge 12 flow out toward approximately the center (the center of the circle C) S of the convex arc, regardless of in which part they are generated. As a result, the chips are made to collide against the wall face 13 of the recess 10, receive resistance, and are thereby curled, divided and processed.

Additionally, for example, even in a case where a flat bottom face is formed on a work material by the portion ranging from the periphery of the protruding end P of the corner cutting edge 12 across the intersection point Q to the end cutting edge 9 by feeding out the end mill body 1 in a direction perpendicular to the axis O, as well as by such a ¼ arcuate portion of the corner cutting edge 12, according to the radius end mill of the above construction, for example, even if chips are divided along the intersection line L from the intersection point Q, and thereby, striped traces are generated on the bottom face which is a surface of a workpiece, the protruding end P of the corner cutting edge 12 is located slightly closer to the tip side in the direction of the axis O than the intersection point Q. Therefore, since the periphery of the protruding end P of the corner cutting edge 12 will cut the striped traces formed on the bottom face with the feed of the end mill body 1 so as to sweep off the traces, such traces are not left on the bottom face consequently. Accordingly, even in such working, the bottom face can be smoothly finished, and precise workpiece can be obtained.

Here, even if the intersection line L between the corner cutting edge rake face 11 and the end cutting edge rake face 8 extends from the rear end side more than the protruding end P of the corner cutting edge 12 in this way, if the absolute value of the radial spacing between the intersection point Q between the end cutting edge 9 and the corner cutting edge 12, which is the tip of the intersection line L, and the protruding end P, is too small, the protruding amount, in the direction of axis O, of the protruding end P with respect to the intersection point Q also becomes small. As a result, for example, particularly in a case where the protruding end P side is used for cutting even in the ¼ arcuate portion of the corner cutting edge 12, there is a possibility that the above-described effects may not be reliably exhibited.

On the other hand, for example, in a case such as where the radius R of the convex arc that the corner cutting edge 12 forms is small, if the radial spacing between the intersection point Q and the protruding end P is too large, the end cutting edge 9 intersects the corner cutting edge 12 at the intersection point Q, in a place where the corner cutting edge 12 turns around the inner peripheral side beyond the protruding end P and retreats greatly to the rear end side. That is, there is a possibility that the end cutting edge 9 may retreat excessively with respect to the protruding end P of the corner cutting edge 12, and sharpness may be lowered.

For this reason, as for the radial spacing between the protruding end P of the corner cutting edge 12, and the intersection point Q which is the tip of the intersection line L between the corner cutting edge rake face 11 and the end cutting edge rake face 8, the difference A-B between the radial length A from the axis O to the center S of the convex arc that the corner cutting edge 12 forms, and the radial length B from the axis O to the intersection point Q which is the tip of the intersection line L is set to 0.1 mm or more, and is desirably set to a value within a range of 0.2 mm+0.2×R with respect to the radius R (mm).

Industrial Applicability

In the end mill of the invention, damage to a corner cutting edge or degradation of the roughness of a surface of workpiece caused by changes in the cutting edge strength of the corner cutting edge or variations of cutting load can be prevented.

The invention claimed is:
1. A radius end mill,
wherein a flute is formed at a tip outer periphery of an end mill body which rotates around an axis,
wherein the tip outer peripheral side of the wall face of the flute which faces the rotational direction of the end mill is to be used as a corner cutting edge rake face,
wherein a corner cutting edge forming a convex arc shape of which the rotation locus around the axis becomes convex toward the tip outer peripheral side is formed at a side ridge portion of the corner cutting edge rake face,
wherein a gash is formed on the inner peripheral side of the corner cutting edge rake face,
wherein the wall face of the gash which faces the rotational direction of the end mill is to be used as an end cutting edge rake face,
wherein an end cutting edge connected to the corner cutting edge and extending toward the inner peripheral side is formed at the tip-side side ridge portion of the end cutting edge rake face, and
wherein an intersection line between the corner cutting edge rake face and the end cutting edge rake face is located closer to the radial inner peripheral side with respect to the axis than the center of the convex arc that the corner cutting edge forms in the rotation locus around the axis, and extends from the rear end side in the direction of the axis more than the protruding end of the corner cutting edge in the direction of the axis.
2. The radius end mill according to claim 1,
wherein the difference between the radial length from the axis to the center of the convex arc that the corner cutting edge forms and the radial length from the axis to the tip of the intersection line is set to 0.1 mm or more, and is set to a value within a range of 0.2 mm+0.2×R or less with respect to the radius R (mm) of the convex arc that the corner cutting edge forms in the rotation locus around the axis.

* * * * *